United States Patent
Wang et al.

(10) Patent No.: US 6,931,173 B1
(45) Date of Patent: Aug. 16, 2005

(54) MEMS OPTICAL SWITCHES WITH GUARANTEED SWITCHING STATUS

(75) Inventors: Xinzhong Wang, Milpitas, CA (US); Chun He, Fremont, CA (US); Yao Li, Fremont, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 181 days.

(21) Appl. No.: 10/640,888

(22) Filed: Aug. 14, 2003

(51) Int. Cl.[7] ............................ G02B 6/35; H04B 10/08
(52) U.S. Cl. .............................. 385/18; 385/16; 398/19
(58) Field of Search .................... 385/16–24; 398/9–38

(56) References Cited

U.S. PATENT DOCUMENTS

| | | | |
|---|---|---|---|
| 5,025,346 A | 6/1991 | Tang | |
| 6,301,402 B1 | 10/2001 | Bhalla | |
| 6,459,524 B1 | 10/2002 | Zhang | |
| 6,519,383 B1 | 2/2003 | Cannell | |
| 6,574,384 B1 | 6/2003 | Cannell | |
| 6,828,884 B2 * | 12/2004 | Wyeth et al. | 333/262 |
| 2003/0048036 A1 | 3/2002 | Lemkin | |
| 2002/0167713 A1 | 11/2002 | Le | |

* cited by examiner

Primary Examiner—Michelle R. Connelly-Cushwa
(74) Attorney, Agent, or Firm—Joe Zheng

(57) ABSTRACT

Techniques for controlling and monitoring MEMS optical switches are disclosed. In one embodiment, an electronic feedback loop is employed to determine a control signal to a MEMS switch actuator in accordance with an instruction. The control signal is so determined in such a way that the switching statuses are maximally guaranteed. To generate an appropriate control signal, AC or DC impedances of the MEMS switch are detected and used to configure the control signal to drive the switch. When it is detected that the impedance changes do not meet respective thresholds, the control signal is adjusted. In the case that the stiction happens, the switch actuator is overcharged, discharged and repeatedly applied for a limited time to overcome the stiction.

20 Claims, 4 Drawing Sheets

MEMS OPTICAL SWITCHES WITH GUARANTEED SWITCHING STATUS

BACKGROUND OF THE INVENTION

1. Field of the Invention

The invention is generally related to the area of optical components. In particular, the invention is related to MEMS switches (Micro Electro Mechanical Systems) and method for controlling/monitoring switching statuses of one or more MEMS switches.

2. The Background of Related Art

Optical interconnections can be done in two ways: i) Optoelectronic, where the optical data are first converted into electronic signal, then cross-connection is accomplished by electronic circuit. The electronic output is then converted back into optical signal; ii) Direct cross-connection of optical channels. This optical (photonic domain) interconnection where the signal does not need to be converted back and forth is known as "all optical switching."

Various efforts have been spent on developing faster electronics to process higher data bit rates and novel optical networks components to increase the information carrying capacity of the optical networks. As the data bit rates increase, it becomes increasingly difficult to implement electronic switching solutions. It is now known that the information carrying laser beams should be dealt with at the optical level.

Recently a class of MEMS switches has been deployed as optical switches. These MEMS devices typically are small in size and may be integrated with other electrical circuits on a common substrate (e.g., silicon substrate). As a result, the MEMS devices are being used in numerous applications such as optical switching and optical attenuators in optical communications. Generally, an MEMS optical switch includes a small mirror that can be extended and retracted in various positions. In one instance, the mirror can be respectively extended to interpose between optical channels such that an optical beam traveled in a channel is reflected. In another instance, the mirror can be respectively retracted to be away from the optical channel such that optical beam traveled in the channel passes through without being reflected. Accordingly, depending on the position of the mirror, the optical beam can be switched into different optical channels.

In operation, an optical beam is routed by a small mirror which is driven by an electrostatic force, or others, such as, magneto-static, or thermal. Because they allow mass manufacturing of accurate miniaturized devices using materials and processes that have been proven for their stability, precision, and reliability, the silicon-based MEMS switches have been proven to be the technology of choice for optical communications. However, there are two major drawbacks in MEMS switches that hinder their inclusive replacement of the traditional opto-mechanical switches: (1) guaranteed switching action, and (2) potential sticking of actuator (stiction adhesion). The fundamental requirements for a fiber optic switch are that, when a switch command is given, it not only executes the command by applying a power source to its actuation mechanism, it can also (1) provide a feedback signal for assuring the mechanical position change of the mirror, and (2) reduce the opportunity of stiction that affects its performance reliability.

For a MEMS switch, the assessment of its switching position is difficult, due to its miniature size and its integrated manufacturing process. In U.S. Pat. No. 6,301,402, an extra light source emitting light at an 'out-of-band' light frequency modulated at low frequency was employed for the purpose of detection switching mirror on/off state. To facilitating the detection of the switching mirror on/off state, other extra components are needed, such as 1×N switch, a tap coupler, a PIN detector, and a demodulator, in addition to electronic control and feedback circuitry. Not only does this approach add cost and complication, increases insertion loss, polarization dependent loss (PDL), and wavelength-dependent loss (WDL), it also adds noise to the transmitting optical signal.

U.S. Pat. No. 6,301,402 and U.S. Pat. No. 6,519,383 both shows that specially dedicated mirror arrays are added in addition to the actual mirrors used for switching. These extra mirrors are manufactured together with the switching mirrors for the purpose of testing the proper positions of the switching mirrors. It can be appreciated that the switching systems as disclosed are not only expensive but also considerably reduces the manufacturing yield.

U.S. Pat. No. 6,459,524 also discloses that an additional pair of electrodes, besides the comb drive, is employed for the purpose of sending an electrical signal out when the two electrodes are in contact when the move of comb drive reach its final destination. Obviously, this method requires additional MEMS components being manufactured, which requires special wafer process, such as vertical metallization of these components, together with the required mirror or actuation driving mechanism.

Stiction adhesion can be very problematic in electrostatically-driven MEMS actuators, it degrade MEMS device reliability. To solve this problem, U.S. patent 2002/0167713 A1 utilizes a discharge system upon pull-in of moveable structure, this adds complexity of device manufacture.

There thus is a need for MEMS switches that guarantee switching actions with position indication and minimized potential stiction adhesion without much additional cost to the device manufacture.

SUMMARY OF THE INVENTION

This section is for the purpose of summarizing some aspects of the present invention and to briefly introduce some preferred embodiments. Simplifications or omissions in this section as well as in the abstract may be made to avoid obscuring the purpose of this section and the abstract. Such simplifications or omissions are not intended to limit the scope of the present invention.

In general, the present invention pertains to designs of MEMS switches (Micro Electro Mechanical Systems) and method for controlling/monitoring switching statuses of one or more MEMS switches. According to one aspect of the present. A feedback loop is employed to determine a control signal to an MEMS switch in accordance with an instruction. The control signal is so determined in such a way that the switching status is maximally guaranteed. In one embodiment, impedances of the MEMS switch are detected and are used to configure the control signal to control the switch. When it is detected that the impedances do not meet respective thresholds, the control signal is adjusted. In the case that the stiction happens, the control signal is surcharged by an additional strength and applied for a short period of time to overcome the stiction. In addition, with the detected impedances of the switch, it is possible to receive the final switching status of the switch.

In one embodiment, a microprocessor unit (MPU) is loaded with executable instructions to produce an initial control signal in accordance with the detected impedances of the MEMS switch. The initial control signal is used to control a power source to generate the control signal. Depending on the way the MEMS switch is controlled, the power source may be a voltage or a current driver or other form of power source. When the stiction occurs, the initial control signal causes the power source to produce a short time overcharged control signal to drive the actuator, without causing damage thereto, and repeat it for a limited time so as to overcome the stiction.

The present invention may be implemented in numerous ways. In one embodiment, it is a method for controlling an optical switch, the method comprising applying an AC signal to an actuator of the optical switch being driven by a control signal from a power source, as a result, the actuator outputting an output signal including an AC component and a DC component, rectifying the AC component to produce a rectified AC component, determining an AC impedance and a DC impedance of the actuator, reporting a failure of the optical switch if the determining of the DC impedance exceeds a first threshold; and reporting a success of the optical switch if the determining of the AC impedance exceeds or is equal to a second threshold. In addition, the method further comprises overcharging the control signal to a predetermined magnitude, if the determining of the AC impedance does not exceeds the second threshold; and applying the overcharged control signal to the actuator for a limited time to cause the optical switch to overcome stiction.

In another embodiment, it is an optical switch system comprising at least an optical switch including a mirror, an actuator, a power source to produce a control signal to drive the actuator, a microprocessor unit (MPU) configured to generate an initial signal to control the power source; and a circuit coupled to the actuator to receive output signals therefrom, the output signal including an AC component and a DC component that are coupled to the MPU for determining an AC impedance and a DC impedance of the actuator.

One of the objects, features, advantages of the present invention is to provide an MEMS switch system that can be controlled to overcome stiction.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of MEMS optical switches. According to one aspect of the invention, a feedback loop is employed to determine a control signal to an MEMS switch in accordance with an instruction. The control signal is so determined in such a way that the switching status is maximally guaranteed. In one embodiment, impedances of the MEMS switch are detected and are used to configure the control signal to control the switch. When it is detected that the impedances do not meet respective thresholds, the control signal is adjusted. In the case that the stiction happens, the control signal is surcharged by an additional strength and applied for a short period of time to overcome the stiction. In addition, with the detected impedances of the switch, it is possible to receive the final switching status of the switch.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
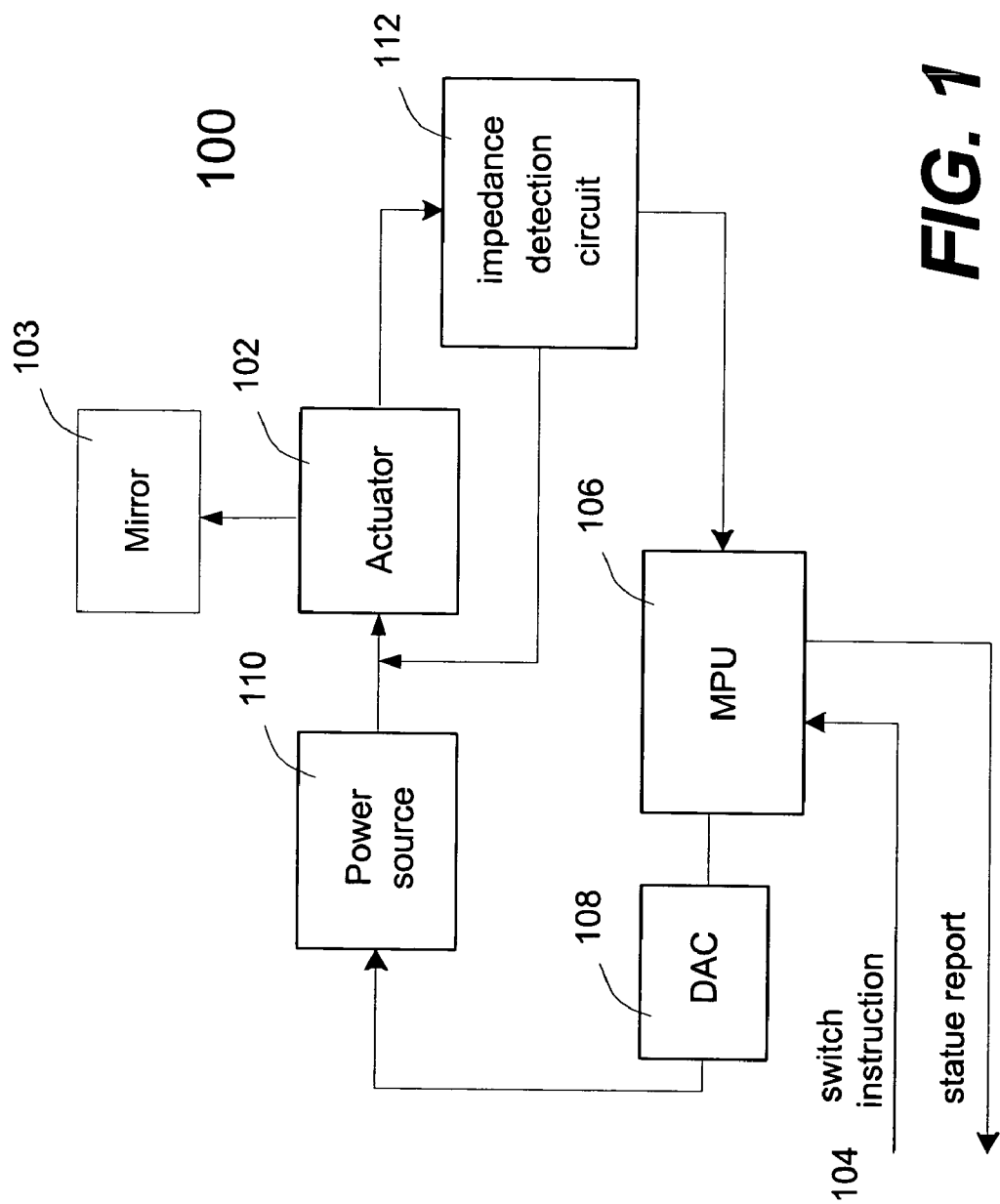
FIG. 1 illustrates a functional block diagram of controlling an MEMS switch in accordance with one embodiment of the present invention, wherein the MEMS switch is actuated by an actuator.

Referring now to the drawings, in which like numerals refer to like parts throughout the several views. FIG. 1 illustrates a functional block diagram 100 of controlling an MEMS switch in accordance with one embodiment of the present invention, wherein the MEMS switch is represented by an actuator 102, and mirror 103. The control block diagram 100 includes a microprocessor unit (MPU) 106, a digital-to-analog (DAC) 108, a power source 110, an actuator 102 and an impedance detection circuit 112. In particular, a feedback loop is formed about the actuator 102 to control and monitor the switching status of the MEME switch.

There are many ways to move or control a MEMS switch. Three popular ways of actuating an MEMS switch are electrostatic, electromagnetic and thermal. Electrostatic actuation uses the fact that applying a voltage across two surfaces causes them to be attracted to each other. Electromagnetic actuation refers to the interaction between two magnetic circuits. Thermal actuation uses heat generated by passing currents through resistors to either deform structures or heat up liquids and generate bubbles. Regardless how an MEMS switch or an actuating mechanism therein is controlled, a control signal (e.g., current or voltage) is provided.

An instruction or a command 104 is received, for example, to turn on or off the MEMS switch to achieve a desired function. The MPU 106 receives the command 104 and generates an initial control signal. The MPU 106 is loaded with executable instructions implementing one embodiment of present invention. The detail of the executable instructions is described below.

The initial control signal from the MPU 106 is coupled to the DAC 108 to convert the control signal into an analog format thereof. The converted initial control signal is used to control the power source 110 to generate an appropriate control signal to drive the actuator 102. According to one embodiment, the control signal rises gradually to minimize switch ringing. Depending on how the MEMS switch is controlled, the power source 110 can be a current, voltage or other power source. To facilitate the description of the present invention, a high voltage driver is illustrated in FIG. 1 as the power source 110 for electrostatic actuator.

Figure 4:
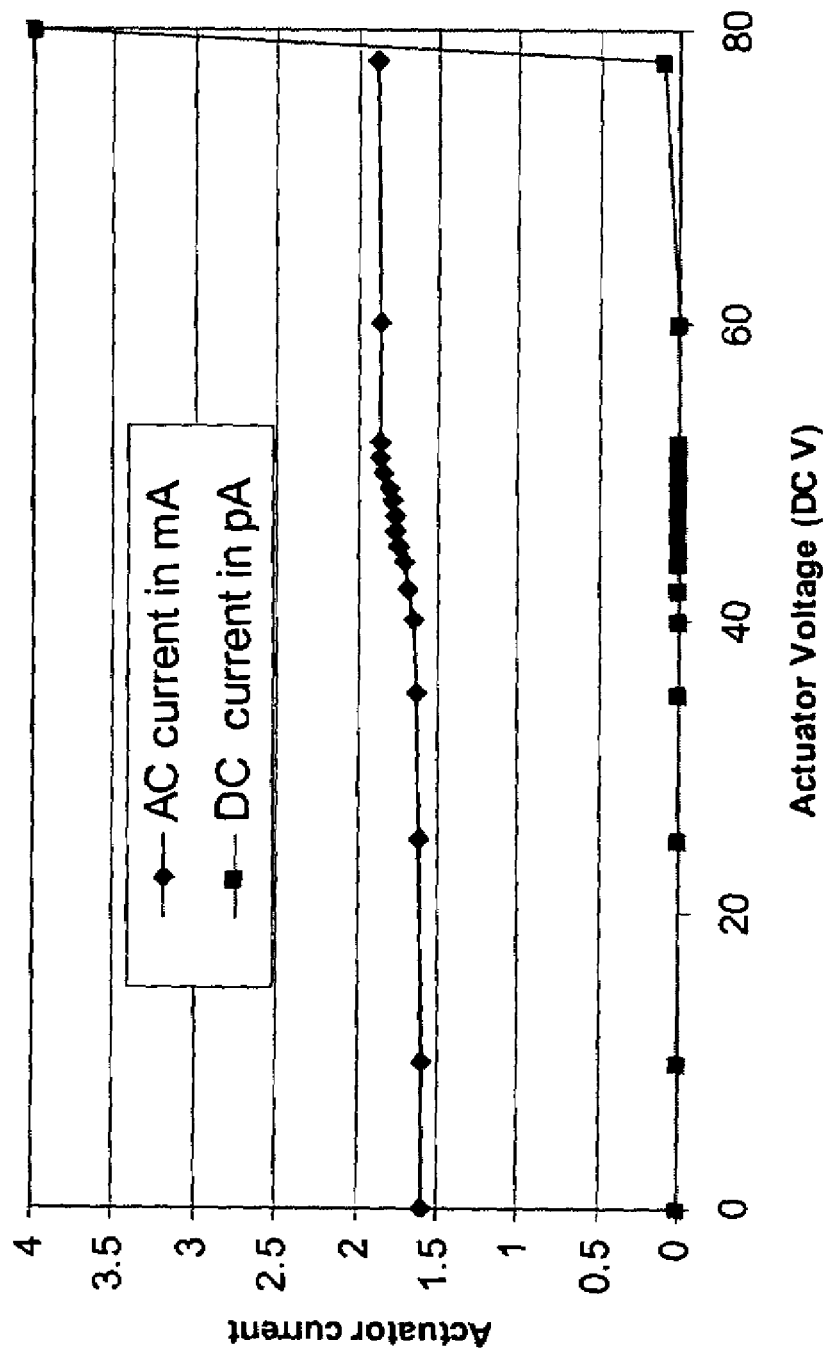
FIG. 4 shows a typical comb drive AC and DC current change driven by a different DC source and a fixed AC source.

Whenever the switch changes its position, for example, from one status to another status, an intrinsic impedance of the MEMS actuator changes (an example is provided in FIG. 4). The impedance of the MEMS actuator, originated from the physical position change of MEMS components (the moving plate of actuator) therein, functions either as optical purpose or as the actuation mechanism or both, and is utilized to detect the switching status of the MEMS switch.

From a circuit perspective, an actuator can be modelled as a pair of variable capactior and resistor for electrostatic actuator. With an appropriate actuating signal, an impedance of the actuator per the signal can be detected. According to one embodiment, there are two types of signals applied to the actuator, one is an AC signal originating from an oscillatoring source, and another one is a DC signal originating from the controlled power source (e.g., voltage source 110).

Figure 2:
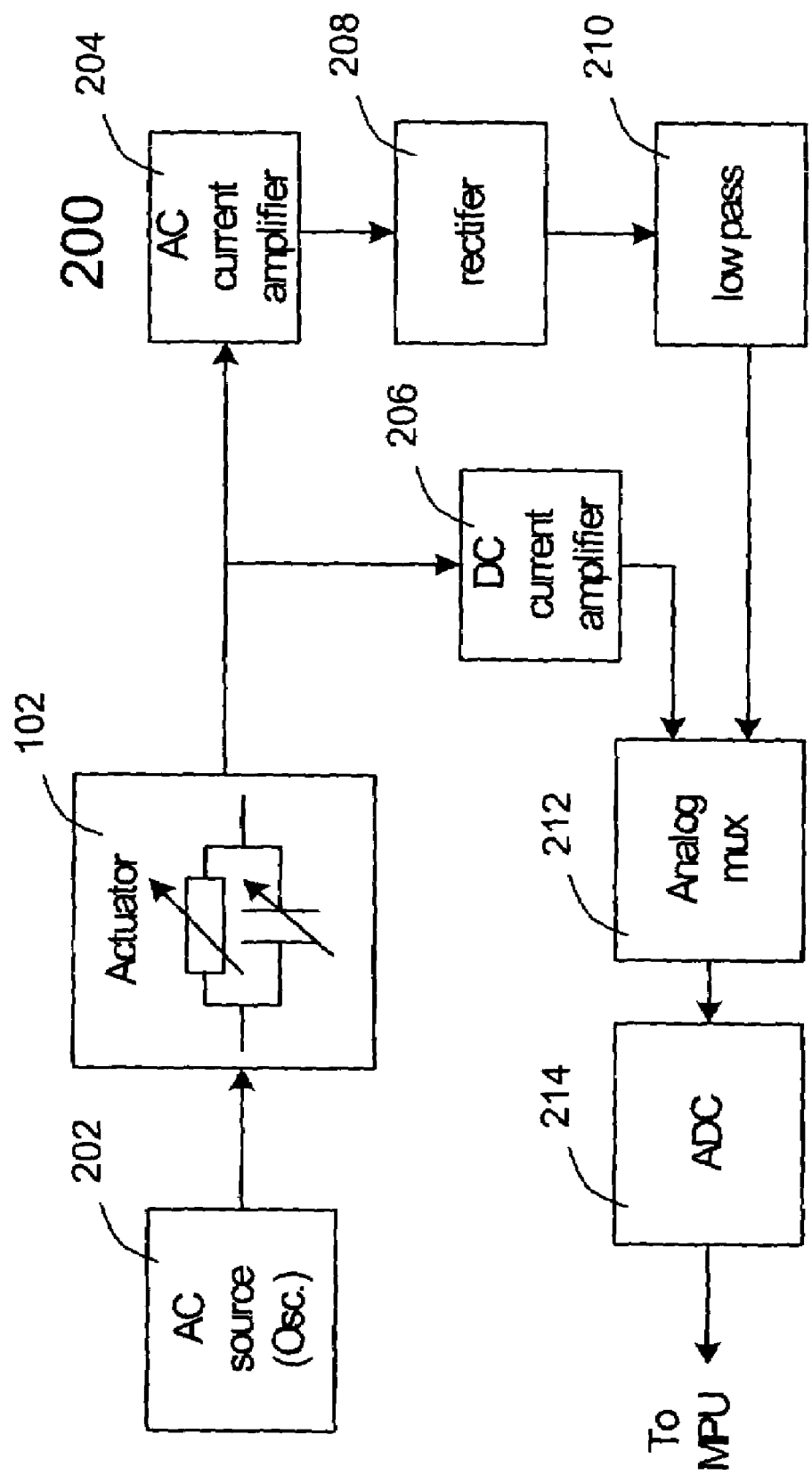
FIG. 2 shows a functional block diagram 200 for realizing the impendance detection.

FIG. 2 shows a functional block diagram 200 for realizing the impendance detection. The diagram 200 includes an AC source 202 applied to the actuator 102, an AC current amplifier 204, a DC currrent amplifier 206, a rectifier 208 that converts an AC signal to a DC signal, a low-pass filter 210, an analog Mux 212 and an analog-to-digital converter (ADC) 214. The AC oscillator source 202 produces an AC signal and is applied to the actuator 102. The AC component in an output signal from the actuator 102 is received in the AC current amplifier 204 and amplified therein. The amplified AC component is then rectified and coupled to the analog Mux 212 through the low pass filter 214.

The DC component in the output signal from the actuator 102 is received in the DC currrent amplifier 206. The amplified DC component is also coupled to the analog Mux 212. The ADC 214, coupled to the analog Mux 212, converts the AC and DC components into digital formats to be supplied to the MPU 106 of FIG. 1. Thus both the DC and AC impedance can be computed from the output signal. Normally, in static state, for electrostatic actuator, the DC imdepence is nearly infinite, e.g. the actuator can be viewed as a varible capacitor. The AC impedence should changes with different actuator voltage applied.

One element which bears great importance in MEMS switches is stiction. Whenever two physical elements touch each other, there is always a possibility that unintentional adhere together, especially if the elements have large surface areas relative to their volumes. Stiction has many causes. The most common cause is electrostatic discharge events and mechanic shock during handling and operation. Stiction may be a chronic problem, however even if the chance is very low, it greatly degrades its switching reliability.

Whenever the stiction happens, one of the two problems or both of them occur: (1) the DC impedance greatly drops due to short circuits between the actuator plates (parallel plate actuator) or comb drive pair (for comb drive actuator), and (2) the AC current does not change or changes less than a desired threshold/when applying the voltage to actuator. When any one of them is detected, the MPU can be configured to report a switch failure if the stiction cannot be removed within a given time. In general, the decision whether the switching is successful or not is depended on both of the two criteria if a driving voltage is applied to the MEMS actuator.

Figure 3:
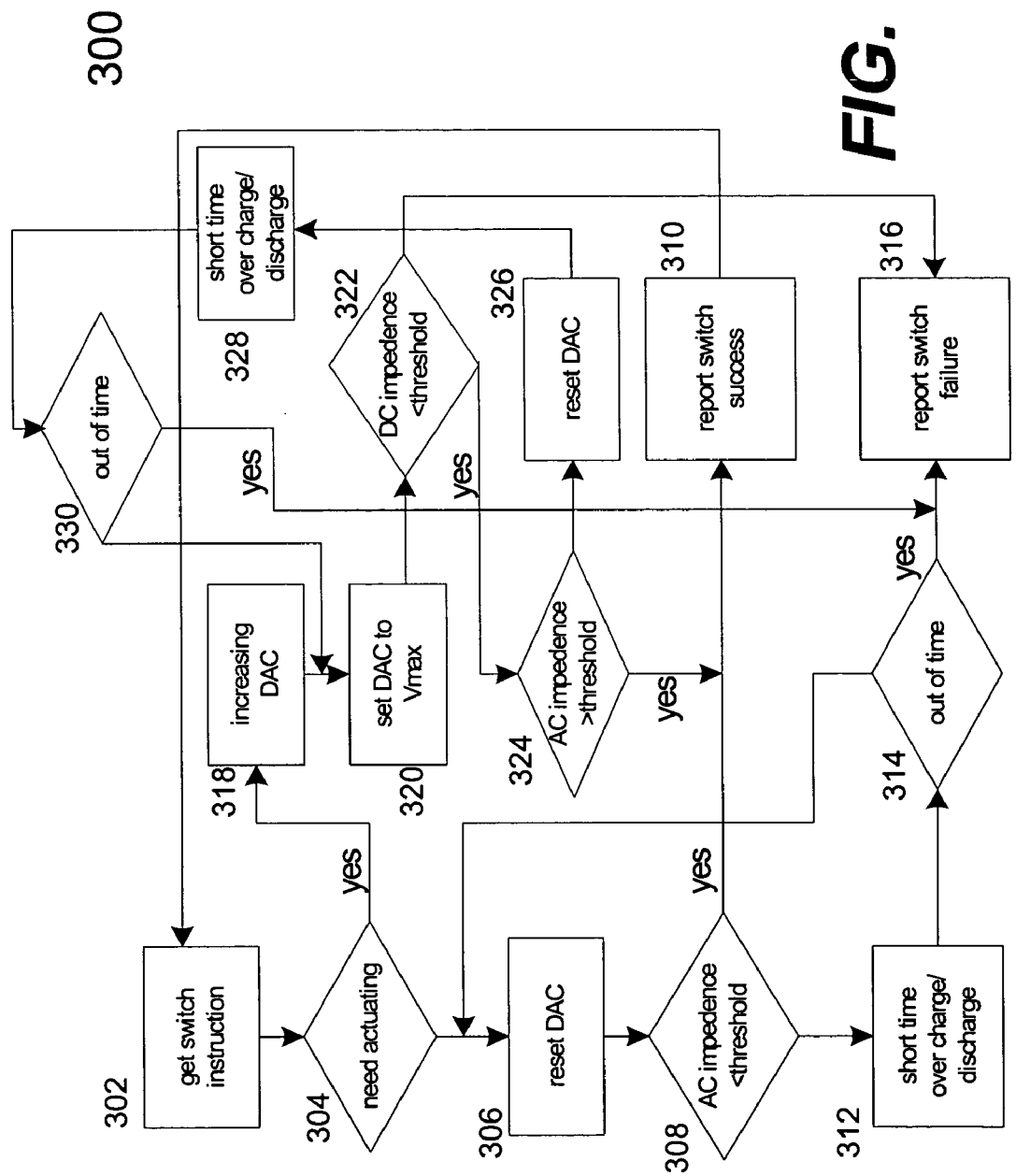
FIG. 3 shows a flowchart or process 300 implementing instructions to cause the MPU to perform control of the actuator according to one embodiment of the present invention.

FIG. 3 shows a flowchart or process 300 implementing instructions to cause the MPU to perform control of the actuator according to one embodiment of the present invention. At 302, an instruction or command to control a switch is received, for example, from a control device on a network. At 304, whether the switch needs to be actuated is determined in view of the current switching position of the switch. When it is determined that there is no need to actuate the switch, the process 300 goes to 306 where the control signal of the power source is reset (e.g., set to zero). At 308, the AC impedance of the actuator is detected and compared with a threshold therefor. If the impedance is less than the threshold, the process 300 goes to 310 reporting that the switch has been tuned to where it is needed in accordance with the command.

When the impedance is greater than the threshold at 308, the process 300 goes to 312 to overdrive the actuator with a controlled signal overcharged to an additional strength. The overcharged signal can be applied to the actuator for only a limited time to avoid damage to the actuator. It has been observed that a fast leading edge and repeating overcharged/discharged control signal below a damaging voltage threshold applied to an acuactor can effectively remove the stiction in most cases. Therefore, at 304, when a preset time for such overdrive is exceeded, the process 300 goes to 316 reporting the failure of the switch. If the preset time is not exceeded, the process 300 goes to 306 to continue to overdrive the actuator till either the switch is successfully switched or failed.

Back to 304, when it is determined that there is a need to actuate the switch, the process 300 goes to 318 increasing the control signal or 320 lifting the control signal to the device specific best voltage (called Vmax, maximum value that is far below the damaging threshold but achieves device best performance with respect to the ringings and optical insertion loss). At 322, the DC impedance of the actuator is determined and compared with a predefined threshold. If the threshold is exceeded, the process 300 goes to 324 to continue to determine the AC impedance of the actuator and compare the value with a predefined threshold. If the AC impedance of the actuator is indeed greater than the threshold, the process 300 goes to 310 reporting that the switch has been tuned to where it is needed in accordance with the command. However, if the AC impedance of the actuator is less than the threshold, the process 300 goes to 326 to reset the control signal to overdrive the actuator with a controlled signal overcharged to an additional strength. The overcharged signal can be applied to the actuator for only a limited time to avoid damage to the actuator. If the time for which the overcharged signal has been applied to the actuator exceeds a time limit at 328, the process goes to 316 reporting the failure of the switch. Otherwise, the process 300 goes to 320 to set the control signal to a predetermined maximum.

One of the important features in the present invention is to use the intrinsic impedance change in the MEMS switches to achieve the control and report the switching function in MEMS switch. The present invention has many advantages over the prior art systems. First, the present invention does not need extra expansive opto-electronic and optical components, such as out-of-band light source, 1×N switch, tap coupler, PD, and demodulator for monitoring the switching action. Second, the present invention does not require the extra raw of column of mirrors being manufactured together with the switch mirrors, for the purpose of testing the proper positions of the mirrors that are designed for actual switching. Third, the present invention does not impact switch optical design and performance. Fourth, the present invention does not add noise to the transmission signal and utilizes a control feedback to increase the switching reliability of the MEMS switch. Fifth, the present invention provide a cost effective way to improve reliability arising from the stiction problem of MEMS device. Other features can be readily appreciated by those skilled in the art from the detailed description herein.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for controlling an optical switch, the method comprising:
    applying an AC signal to an actuator of the optical switch being driven by a control signal from a power source, as a result, the actuator outputting an output signal including an AC component and a DC component;
    rectifying the AC component to produce a rectified AC component;
    determining an AC impedance and a DC impedance of the actuator;
    reporting a failure of the optical switch if the determining of the DC impedance exceeds a first threshold; and
    reporting a success of the optical switch if the determining of the AC impedance exceeds or is equal to a second threshold.

2. The method of claim 1, further comprising:
    overcharging the control signal to a predetermined magnitude, if the determining of the AC impedance does not exceed the second threshold; and
    applying the overcharged control signal to the actuator for a limited time to cause the optical switch to overcome stiction.

3. The method of claim 1, wherein the control signal is regulated by a microprocess unit (MPU).

4. The method of claim 3, wherein the MPU is configured to produce an initial control signal in accordance with a command to control the optical switch.

5. The method of claim 4, wherein the initial control signal is applied to the power source to generate the control signal.

6. The method of claim 4, wherein the initial control signal causes the overcharging of the control signal to the predetermined magnitude.

7. The method of claim 6, further comprising reporting a failure of the optical switch if a time in which the overcharged control signal is applied to the actuator exceeds a time limit.

8. The method of claim 4, wherein the initial control signal causes the control signal to increase gradually to a predetermined value for ringing damping.

9. The method of claim 1, further comprising:
    determining a current switching status of the optical switch in reference to a command to control the optical switch; and
    if there is no need to actuate the actuator, resetting the control signal;
    if there is no need to actuate the actuator, increasing the control signal gradually to a predetermined value.

10. An optical switch system comprising:
    at least an optical switch including an actuator, and a mirror;
    a power source to produce a control signal to drive the actuator;
    a microprocessor unit (MPU) configured to generate an initial signal to control the power source; and
    a circuit coupled to the actuator to receive an output signal therefrom, the output signal including an AC component and a DC component that are coupled to the MPU for determining an AC impedance and a DC impedance of the actuator.

11. The optical switch system of claim 10, further comprising:
    an AC power source producing an AC signal to be applied to the actuator for producing the AC component.

12. The optical switch system of claim 10, wherein, if the DC impedance does not exceed a first threshold, and the AC impedance exceeds or is equal to a second threshold, the control signal from the power source is overcharged, discharged and repeatedly applied to the actuator for a limited time to overcome stiction.

13. The optical switch system of claim 10, wherein, if the DC impedance exceeds a first threshold, the MPU reports a failure of the optical switch.

14. The optical switch system of claim 10, wherein, if the AC impedance exceeds or is equal to a second threshold, the MPU reports a success of the optical switch.

15. The optical switch system of claim 10, wherein the optical switch is formed on a substrate.

16. The optical switch system of claim 15, wherein the circuit is also formed on the substrate.

17. The optical switch system of claim 16, wherein the circuit includes an AC amplifier and a DC amplifier to amplify the AC component and the DC component, respectively.

18. The optical switch system of claim 17, wherein the circuit further includes a rectifier and a low-pass filter to produce a representation of the amplified AC component.

19. The optical switch system of claim 18, wherein the circuit further includes an analog MUX receiving the amplified DC component as well as the representation of the amplified AC component.

20. The optical switch system of claim 19, wherein both of the DC component and AC component are subsequently coupled to the MPU for forming a feedback system to precisely control the actuator.

* * * * *